Feb. 6, 1923.

G. C. ROHRBACH.
ARTIFICIAL BAIT.
FILED APR. 15, 1922.

1,444,390.

George C. Rohrbach,
Inventor

By
Attorney

Patented Feb. 6, 1923.

1,444,390

UNITED STATES PATENT OFFICE.

GEORGE C. ROHRBACH, OF READING, PENNSYLVANIA.

ARTIFICIAL BAIT.

Application filed April 15, 1922. Serial No. 553,055.

*To all whom it may concern:*

Be it known that I, GEORGE C. ROHRBACH, a citizen of the United States, residing at Reading, in the county of Berks and State of Pennsylvania, have invented certain new and useful Improvements in Artificial Bait, of which the following is a specification.

This invention relates to improvements in artificial bait and it is intended primarily as a bait for use in casting, or, for what is usually termed a floating bait.

The object in the present invention is to provide a bait in the form of a fly or insect, provided with wings, and to overcome the objection of perishable winged insects.

To this end, I provide a fly with a pair of wings consisting entirely of a pair of loops formed by bending a piece of catgut to the contour of approximately the outline of a pair of wings, depending on the illusion produced, when the fly is sighted, of a transparent wing.

The invention is more fully described in the following specification and clearly illustrated in the accompanying drawing, in which:—

Figure 1:
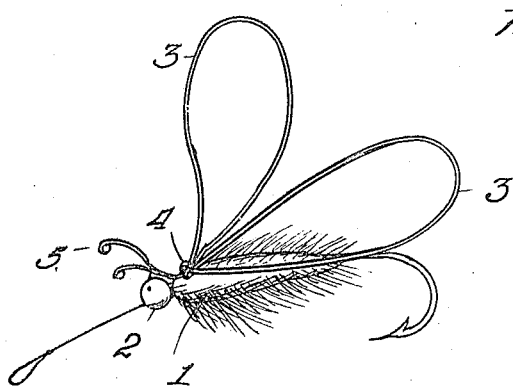
Figure 2:
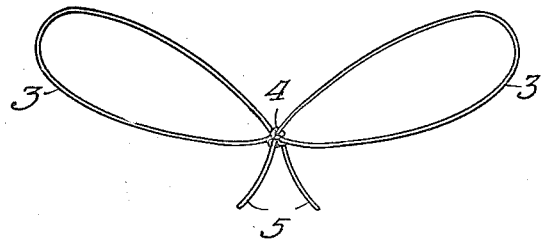

Figure 1 is a side view of a fly, illustrating my invention, while Figure 2 shows the formation of the wings by bending together a piece of catgut.

The numeral 1 designates the body and 2 the head of an insect, and these may be of any suitable material.

To provide the insect with attractive wings, wings that will appear to be transparent, I form a double loop 3—3 by bending a piece of catgut upon itself, tying the ends together to form a knot 4, and permitting the ends of the catgut to extend slightly beyond the knot, as shown at 5.

This looped member may be fastened to the body of the insect in any suitable and easy manner, as by a drop of sealing wax or other easy method, in such manner that the loops project from either side, like the wings of an insect, while the ends 5 project over the head of the insect, as shown in Figure 1, completing the outline of the insect.

The pair of loops 3, will, either when in the water or in the air, produce the illusion of a pair of transparent wings, and I have found by actual experience that the deception is greater than is the result when a transparent wing or semi-transparent wing is used.

An additional advantage of this form of wing, is that the cost is materially reduced, and another feature is the fact that there is nothing to warp or destroy the proper effect.

It is evident that two or more pairs of wings, of different size, may be applied to each insect, if desired, and that the bodies of the insects may be varied at will, for the entire invention in the present instance lies in the formation of the wings by merely looping a pliable body to form the outlines of the wings, depending on the effect produced to carry with it that of a transparent wing

Having thus described my invention, I claim:—

1. Artificial bait comprising a body provided with a plurality of catgut loops secured thereto and projecting at an angle therefrom to represent wings.

2. As a new article of manufacture, a piece of catgut bent to form a pair of wings, tied together where the wings meet and having its extremities extending beyond the tying point.

In testimony whereof I affix my signature.

GEORGE C. ROHRBACH.